United States Patent
Djenguerian et al.

(10) Patent No.: US 9,450,478 B1
(45) Date of Patent: Sep. 20, 2016

(54) LOAD RESPONSIVE JITTER

(71) Applicant: Power Integrations, Inc., San Jose, CA (US)

(72) Inventors: Alex B. Djenguerian, Saratoga, CA (US); Peter Vaughan, Los Gatos, CA (US); Leif Lund, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 14/790,335

(22) Filed: Jul. 2, 2015

Related U.S. Application Data

(60) Provisional application No. 62/145,820, filed on Apr. 10, 2015.

(51) Int. Cl.
*H03B 1/00* (2006.01)
*H02M 1/088* (2006.01)
*H02M 1/44* (2007.01)

(52) U.S. Cl.
CPC ............. *H02M 1/088* (2013.01); *H02M 1/44* (2013.01)

(58) Field of Classification Search
CPC .... H02M 3/33507; H02M 3/00; H02M 3/44; H02M 3/22; H02M 3/33523
USPC ........... 327/108–112, 427, 434, 437; 326/82, 326/83, 87; 363/16, 21.01, 21.12, 21.13, 363/21.14, 21.15, 21.16, 21.17, 21.18; 323/282, 283, 284
See application file for complete search history.

(56) References Cited

U.S. PATENT DOCUMENTS

| | | | | |
|---|---|---|---|---|
| 6,249,876 B1* | 6/2001 | Balakrishnan | .......... | H02M 1/12 713/300 |
| 8,159,843 B2* | 4/2012 | Lund | ................. | H02M 3/33523 323/284 |
| 8,194,425 B2* | 6/2012 | Park | .................. | H03K 7/06 323/288 |
| 8,368,370 B2* | 2/2013 | Morrish | .................. | H02M 1/44 323/282 |
| 8,421,432 B2* | 4/2013 | Hawkes | ................ | H02M 3/156 323/283 |
| 8,582,324 B2* | 11/2013 | Lin | ......... | H02M 1/14 363/21.12 |
| 8,742,740 B2* | 6/2014 | Zeng | ...... | G01R 19/04 323/283 |
| 8,994,351 B2* | 3/2015 | Zhang | ................ | H02M 3/33523 323/284 |
| 9,065,427 B2* | 6/2015 | Kleinpenning | ... | H02M 3/33507 |
| 2007/0047268 A1* | 3/2007 | Djenguerian | ...... | H02M 3/33515 363/21.13 |
| 2010/0026256 A1* | 2/2010 | Liu | ......... | H02M 3/158 323/282 |
| 2014/0254202 A1* | 9/2014 | Balakrishnan | ......... | H03K 5/084 363/16 |
| 2015/0303898 A1* | 10/2015 | Zhai | ......... | H03K 7/08 327/109 |

\* cited by examiner

*Primary Examiner* — Lincoln Donovan
*Assistant Examiner* — Thomas Skibinski
(74) *Attorney, Agent, or Firm* — Blakely Sokoloff Taylor & Zafman LLP

(57) ABSTRACT

A controller for a power converter that may sense whether the power converter is in a light load condition. If the power converter is a light load condition, the switching frequency may be within the audible noise range. Once the controller senses the light load condition, the controller may modulate the switching frequency of the power switch such that the switching frequency is no longer within the audible noise range. The controller comprises of a current limit generator coupled to generate an initial current limit signal and receive a feedback signal. The controller may sense a light load condition of the power converter and output a light load signal. As a result of the light load signal, the controller may modulate the initial current limit in response to the light load signal indicating a light load condition.

14 Claims, 6 Drawing Sheets

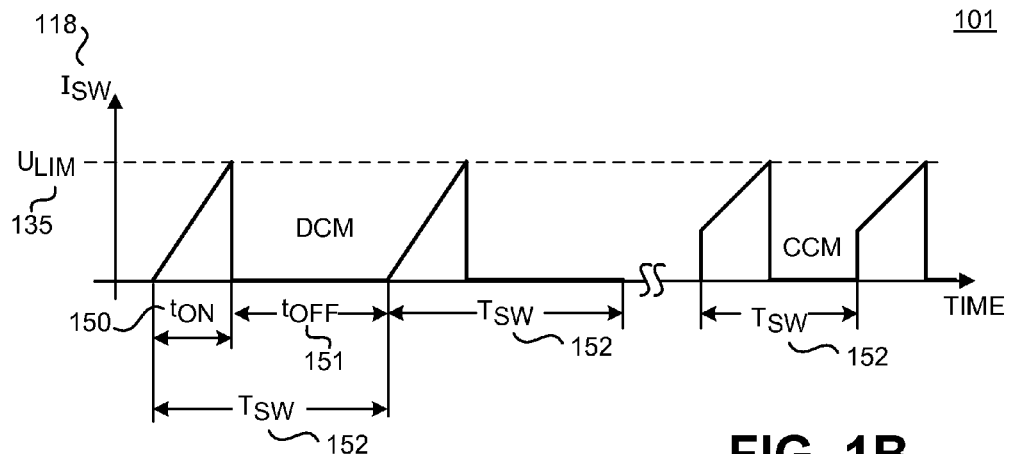
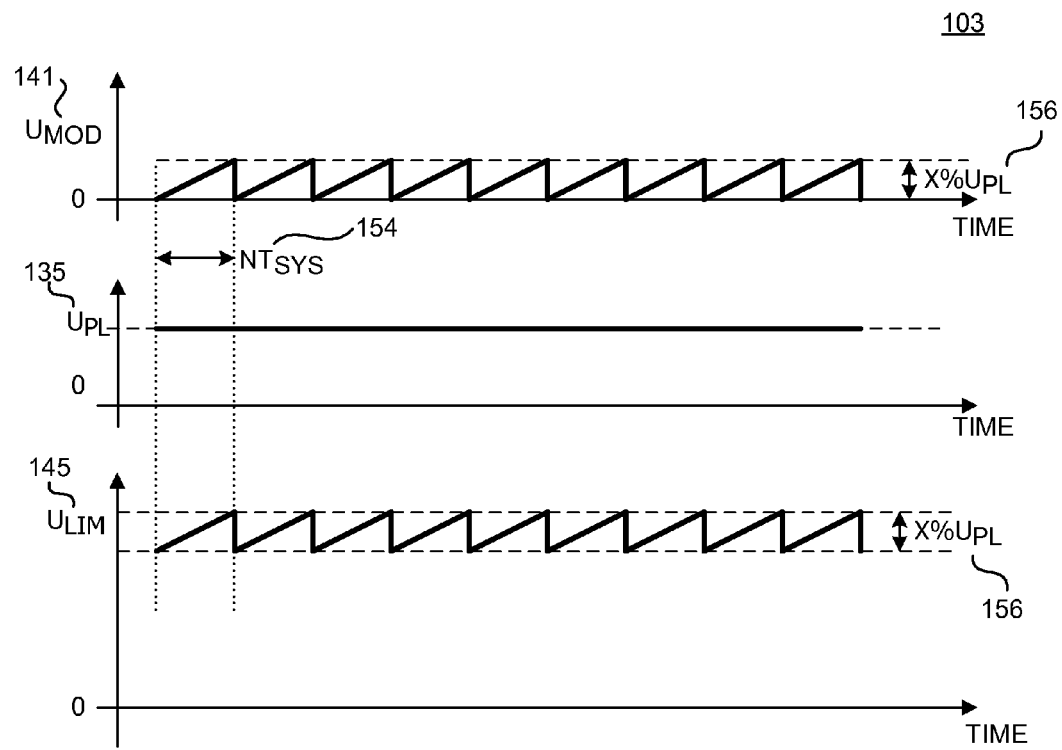
FIG. 1B
FIG. 1C $$X\%ILIM\_1 = \left(\frac{1}{4A} + \frac{1}{2A} + \frac{1}{A}\right)\%LIM\_1 \quad \sim 369$$

$$X\% I_{LIM\_1} = \left(\frac{1}{4A} + \frac{1}{2A} + \frac{1}{A}\right)\% LIM\_1 \quad \sim 469$$

US 9,450,478 B1

LOAD RESPONSIVE JITTER

CROSS-REFERENCE TO RELATED APPLICATION

This application claims the benefit of U.S. Provisional Application No. 62/145,820, filed Apr. 10, 2015, the contents of which are incorporated herein by reference.

BACKGROUND INFORMATION

1. Field of the Disclosure

The present invention relates generally to controlling a power converter. More specifically, examples of the present invention are related to controlling switch mode power converters under varying load conditions.

2. Background

Electronic devices (such as cell phones, tablets, laptops, etc.) use power to operate. Switched mode power converters are commonly used due to their high efficiency, small size, and low weight to power many of today's electronics. Conventional wall sockets provide a high voltage alternating current. In a switching power converter, a high voltage alternating current (ac) input is converted to provide a well-regulated direct current (dc) output through an energy transfer element to a load. In operation, a switch is turned ON and OFF to provide the desired output by varying the duty cycle (typically the ratio of the on time of the switch to the total switching period), varying the switching frequency, or varying the number of on/off pulses per unit time of the switch in a switched mode power converter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1B illustrates a timing diagram of an example switch current for various modes of operation in an example power converter in accordance with the teachings of the present invention.

FIG. 1C illustrates a timing diagram of an example modulation signal, an initial current limit, and a resultant current limit when an example light load sense circuit determines that the power conversion system is in a light load in accordance with the teachings of the present invention.

Figure 1A:
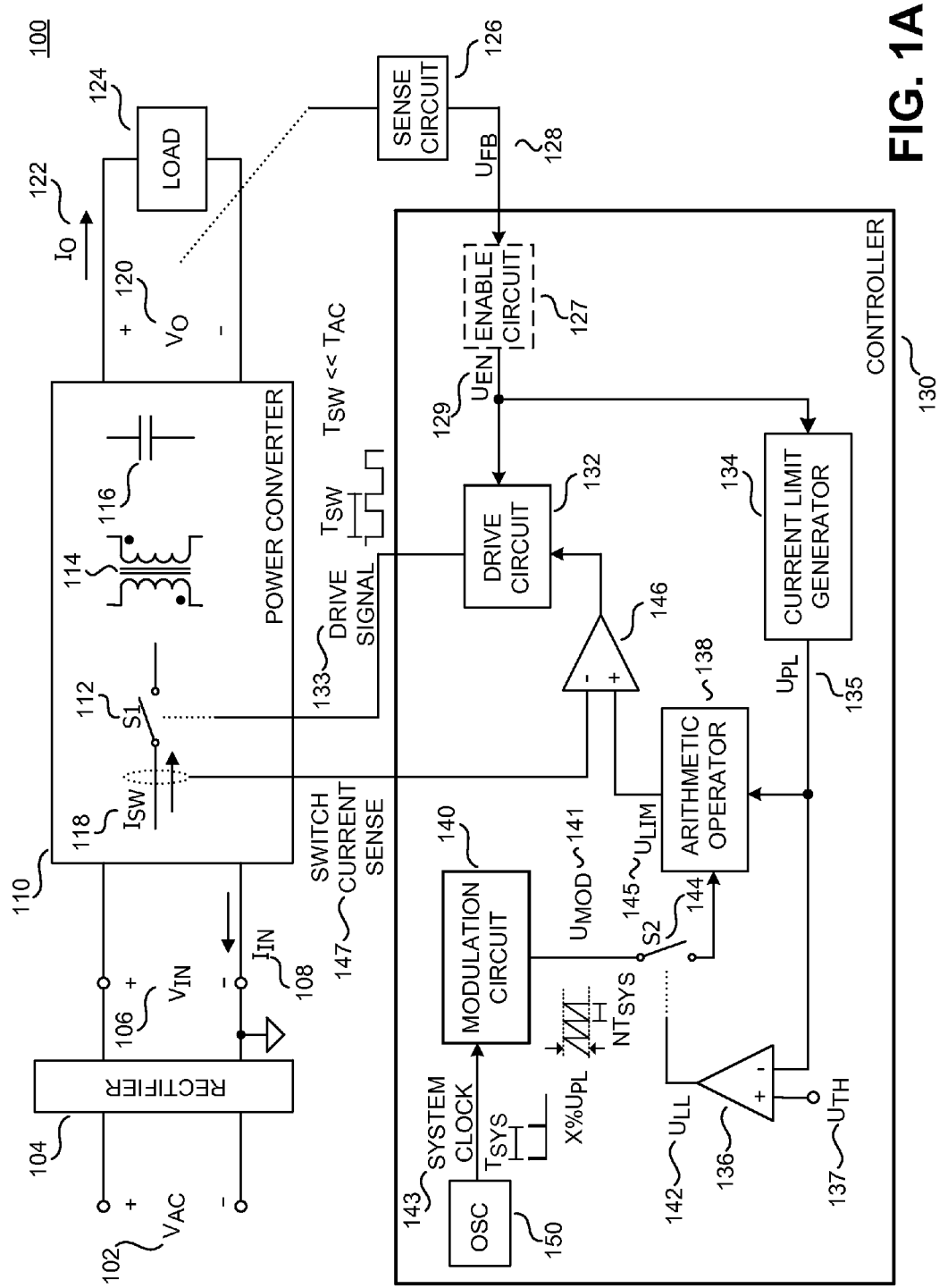
FIG. 1A is a block diagram that illustrates an example power conversion system that receives an input voltage to produce an output voltage and an output current at a load in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

In examples of the present invention, the controller for a power converter may sense whether the power converter is in a light load condition. If the power converter is in a light load condition, the switching frequency may be within the audible noise range. Once the controller senses the light load condition, the controller may modulate the switching frequency of the power switch such that the switching frequency is no longer within the audible noise range. In one example, the power switch turns ON and doesn't turn OFF until the current conducted by the power switch (referred to as the switch current) has reached the current limit. The switching frequency of the power switch may be modulated by modulating the current limit. Further, the current limit is modulated such that the resultant modulated switching frequency is outside of the audible noise range. In one example, 15% modulation of the current limit may result in approximately 30% modulation of the switching frequency of the power switch. The controller may further determine whether the power converter is in a light load condition from the pre-modulated current limit. If the pre-modulated current limit is less than a threshold, then the controller determines that the power converter is in a light load condition. In another example, the pre-modulated current limit may be selected from a list of current limit values. If the pre-modulated is the smallest of the current limit values, then the controller may determine that the power converter is in the light load condition.

FIG. 1A illustrates an example power conversion system 100 that receives an input voltage $V_{IN}$ 106 to produce an output voltage $V_O$ 120 and an output current $I_O$ 122 at a load 124. In one example, the input voltage $V_{IN}$ 106 is a rectified and filtered ac input voltage $V_{RECT}$ 102 received from an input voltage source (not shown). Input voltage $V_{IN}$ 106 and output voltage $V_O$ 120 are positive with respect to an input return 108. Power conversion system 100 includes a power converter 110 that is controlled by a controller 130 to regulate an output, such as an output current $I_O$ 122, an output voltage $V_O$ 120, or both. Power converter block 110 typically includes at least one power switch S1 112, at least one energy transfer element 114, and at least one capacitor 116. Power switch S1 112 may also be referred to as a primary switch. Power conversion system 110 can be configured to be one of many variants of a buck converter by arranging the switches, energy transfer elements, and capacitors of power converter block 110 accordingly. It should be appreciated that any number of topologies for a power converter may benefit from the teachings of the present invention.

The controller 130 is coupled to receive a switch current sense signal 147 which is representative of the switch current conducted by the power switch S1 112. Controller 130 is also coupled to receive the feedback signal $U_{FB}$ 128 which is representative of the output (output voltage $V_O$ 120, output current $I_O$ 122, or both) of the power converter. The controller 130 outputs the drive signal 133 to control switching of the power switch S1 112 in response to the feedback signal $U_{FB}$ 128 and the switch current sense signal 147. The feedback signal $U_{FB}$ 128 may be received from a sense circuit 126. As illustrated in FIG. 1A, the controller 130 includes a drive circuit 132, comparator 146, current limit generator 134, light load sense circuitry 136, and a modulation circuit 140. The controller 130 may also further include an oscillator 150, a secondary switch 144, and an arithmetic operator 138.

In the illustrated example, controller 130 is shown as a single controller, however the elements shown in controller 130 may be in a separate primary controller, a secondary controller, or both. Primary controller controls the switching of the primary switch (such as power switch S1 112), while the secondary controller controls the switching of the secondary switch. A synchronous rectifier may be implemented on the secondary side of the power supply. The primary controller and secondary controller may communicate via communication link. In one example, primary controller and secondary controller may be formed as part of an integrated circuit that is manufactured as either a hybrid or monolithic integrated circuit, which is shown as controller 130. In one example, the primary switch 112 may also be integrated in a single integrated circuit package with controller 130. In another example, the secondary switch may be integrated in a single integrated circuit package with controller 130. However, in another example, it should be appreciated that both the primary controller and the secondary controller need not be included in a single controller package, and for example may be implemented in separate controller packages. In addition, in one example, primary controller and secondary controller may be formed as separate integrated circuits.

The drive circuit 132 and the current limit generator 134 are coupled to receive the feedback signal $U_{FB}$ 128. The drive circuit 132 may control switching of the power switch 112 in response to the feedback signal $U_{FB}$ 128. For example, the drive circuit 132 may output the drive signal 133 to control the on-time, off-time, switching frequency, or the number of pulses per unit time of the power switch 112. The drive signal may be a rectangular pulse waveform with varying lengths of logic high and logic low value and the time between leading edges may be referred to as the switching period $T_{SW}$. The switching period $T_{SW}$ may be much smaller than the ac line period $T_{AC}$. In addition, the drive circuit 132 may receive the output of current limit comparator 146. As illustrated, current limit comparator 146 is coupled to receive the switch current $I_{SW}$ 118 (at its inverting input) through the switch current sense signal 147 and the current limit $U_{LIM}$ 145 (at its non-inverting input). When the switch current $I_{SW}$ 118 has reached the current limit $U_{LIM}$ 145, the drive circuit 132 outputs the drive signal 133 to turn off the power switch 112 (as further illustrated in FIG. 1B). The current limit generator 134 may determine an initial current limit $U_{PL}$ 135 for the controller 130 in response to the feedback signal $U_{FB}$ 128. In one example, when the controller is not in a light load condition, the current limit $U_{LIM}$ 145 is substantially the initial current limit $U_{PL}$ 135.

The controller 130 may also optionally include an enable circuit 127 (illustrated in dashed lines) which may receive the feedback signal $U_{FB}$ 128 and output the enable signal $U_{EN}$ 129. The enable signal $U_{EN}$ 129 provides information to the controller 130 to enable or disable the power switch 112. Further, the enable signal $U_{EN}$ 129 may include one or more enable events, which cause the power switch 112 to be enabled (or disabled). For example, the power switch 112 may be enabled (i.e., turned ON) when an enable event in enable signal $U_{EN}$ 129 is received. In one example, the enable circuit 127 outputs enable signal $U_{EN}$ 129, which in one example is a rectangular pulse waveform with pulse lengths. An enable event in enable signal $U_{EN}$ 129 may be a pulse or a series of pulses that enable (or disable) the power switch 112. The drive circuit 132 may output the drive signal 133 in response to the enable signal $U_{EN}$ 129. In one example, when the drive circuit 132 receives an enable pulse from the enable signal $U_{EN}$ 129, the drive circuit 132 turns ON the power switch 112. Further, the current limit generator 134 may determine the value of the initial current limit $U_{PL}$ 135 in response to the enable signal 129. In one example, the current limit generator 134 may determine the value of the initial current limit signal $U_{PL}$ 135 in response to the frequency of (or the amount of time between) enable pulses in the enable signal $U_{EN}$ 129.

The light load sense circuit 136 is coupled to receive the initial current limit signal $U_{PL}$ 135 and a threshold $U_{TH}$ 137. In the example shown in FIG. 1A, the light load sense circuit 136 is shown as a comparator 136 and the threshold $U_{TH}$ 137 is received at its non-inverting input while the initial current limit signal $U_{PL}$ 135 is received at its inverting input. The light load sense circuit 136 determines if the power conversion system 100 is in a light load condition when the initial current limit signal $U_{PL}$ 135 is less than the threshold $U_{TH}$ 137. As illustrated, the output of the light load sense circuit 136 is the light load signal $U_{LL}$ 142 which may be logic high when the initial current limit signal $U_{PL}$ 135 is less than the threshold Um 137 and logic low otherwise. In one example, the threshold may be substantially equal to 50% of the maximum value of the initial current limit $U_{PL}$ 135.

The modulation circuit 140 is coupled to output a modulation signal $U_{MOD}$ 141 and modulates the initial current limit $U_{PL}$ 135 when the light load sense circuit 136 determines that the power conversion system is in a light load condition. As illustrated, the modulation circuit 140 may receive a system clock 143 from an oscillator 150 and the system clock 143 has period $T_{SYS}$. The modulation circuit 140 may output the modulation signal $U_{MOD}$ 141 in response to the system clock 143. In one example, the modulation signal $U_{MOD}$ 141 may be a sawtooth or triangle waveform with a period substantially equal to N*TSYS. In one example, the value of N may be 8*16. The value of N represents the number of times the system period is modulated and how many cycles per period. The amplitude swing of the modulation signal $U_{MOD}$ 141 may be X % of the value of the initial current limit $U_{PL}$ 135. In one example, the value for X % may be 15%. In another example, the range for X may be between 5% and 40%. Further, the modulation signal $U_{MOD}$ 141 may be a stepped sawtooth or stepped triangular waveform as illustrated in FIGS. 3B and 4B. However, it should be appreciated that any waveform may be used as the modulation signal $U_{MOD}$ 141 if the waveform has sufficient amplitude swing.

Further included in controller 130 may be secondary switch 144 and the arithmetic operator 138. The arithmetic operator is coupled to receive the initial current limit signal $U_{PL}$ 135. In one example, the arithmetic operator may be a terminal. The arithmetic operator further receives the modulation signal $U_{MOD}$ 141 when the secondary switch 144 is closed or conducting. The light load signal $U_{LL}$ 142 outputted by the light load sense circuit 136 may control switching of the switch S2 144. When the light load signal $U_{LL}$ 142 indicates that the power conversion system 100 is in a light load condition, the secondary switch 144 is ON (in other words closed or conducting) and the modulation signal $U_{MOD}$ 141 may be received by the arithmetic operator 138. When the light load signal $U_{LL}$ 142 does not indicate that the power conversion system 100 is in a light load condition, the secondary switch 144 is OFF (in other words not conducting or open) and the arithmetic operator 138 does not receive the modulation signal $U_{MOD}$ 141. In one example, the arithmetic operator 138 may perform any number of arithmetic functions (addition, subtraction, multiplication, division) to the modulation signal $U_{MOD}$ 141 and the initial current limit signal $U_{PL}$ 135 to output the current limit $U_{LIM}$ 145. However, when the arithmetic operator 138 does not receive the modulation signal $U_{MOD}$ 141 (because the light load sense circuit 136 did not sense a light load condition), the outputted current limit $U_{LIM}$ 145 is substantially the initial current limit $U_{PL}$ 135. In one example, the arithmetic operator 138 may add the modulation signal $U_{MOD}$ 141 to the initial current limit $U_{PL}$ 135 when a light load condition is sensed.

FIG. 1B illustrates a timing diagram 101 of an example switch current $I_{SW}$ 118 for various modes of operation, in particular continuous conduction mode (CCM) and discontinuous conduction mode (DCM). During any switching period $T_{SW}$ 152, the primary switch 112 may conduct in response to the drive signal 133. The switching period $T_{SW}$ 152 may be separated into two sections of time: the on-time $t_{ON}$ 150 and the off-time $t_{OFF}$ 151. Switch on-time $t_{ON}$ 150 denotes the portion of the switching period $T_{SW}$ 152 where the switch S1 112 may conduct. Switch off-time $t_{OFF}$ 151 denotes the remaining portion of the switching period $T_{SW}$ 152 when the primary switch 112 cannot conduct. The current waveform of FIG. 1B illustrates two fundamental modes of operation. The trapezoidal shape on the right side of the figure is characteristic of continuous conduction mode (CCM) whereas the triangular shape on the left side of the figure is characteristic of discontinuous conduction mode (DCM). During CCM, the switch current $I_{SW}$ 118 is substantially non-zero immediately after the start of the switch on-time $t_{ON}$ 150. At DCM, the switch current $I_{SW}$ 118 is substantially zero immediately after the beginning of the switch on-time $t_{ON}$ 150. During the switch off-time $t_{OFF}$ 151, the switch current $I_{SW}$ 118 is substantially zero for both CCM and DCM. In addition, the switch 118 may turn OFF once the switch current reaches the current limit $U_{LIM}$ 135. In addition, it should be noted that the minimum switching period $T_{SW}$ 152 may be substantially equal to the period of the system clock $T_{SYS}$.

FIG. 1C illustrates a timing diagram 103 of an example modulation signal $U_{MOD}$ 141, initial current limit $U_{PL}$ 135 and the resultant current limit $U_{LIM}$ 145 when the light load sense circuit 136 determines that the power conversion system 100 is in a light load condition (i.e., secondary switch 144 is conducting). In the example shown, the modulation signal $U_{MOD}$ 141 is a sawtooth waveform with a period of $N*T_{SYS}$ 154 (N times the period of the system clock 143) and an amplitude swing 156 substantially equal to X % of the value of the initial current limit $U_{PL}$ 135. In the example shown, the minimum value of the modulation signal $U_{MOD}$ 141 is substantially zero. The initial current limit $U_{PL}$ 135 is illustrated as a constant non-zero value. For the example of FIG. 1C, the arithmetic operator may add the modulation signal $U_{MOD}$ 141 to the initial current limit $U_{PL}$ 135 to output the current limit $U_{LIM}$ 145. As such, the resultant current limit $U_{LIM}$ 145 is substantially a sawtooth waveform with a period of N ($T_{SYS}$ 154 and an amplitude swing 156 substantially equal to X % of the value of the initial current limit $U_{PL}$ 135. The minimum value of the current limit $U_{LIM}$ 145 is substantially equal to the value of the initial current limit $U_{PL}$ 135 (which is shown as a non-zero value).

Figure 2:
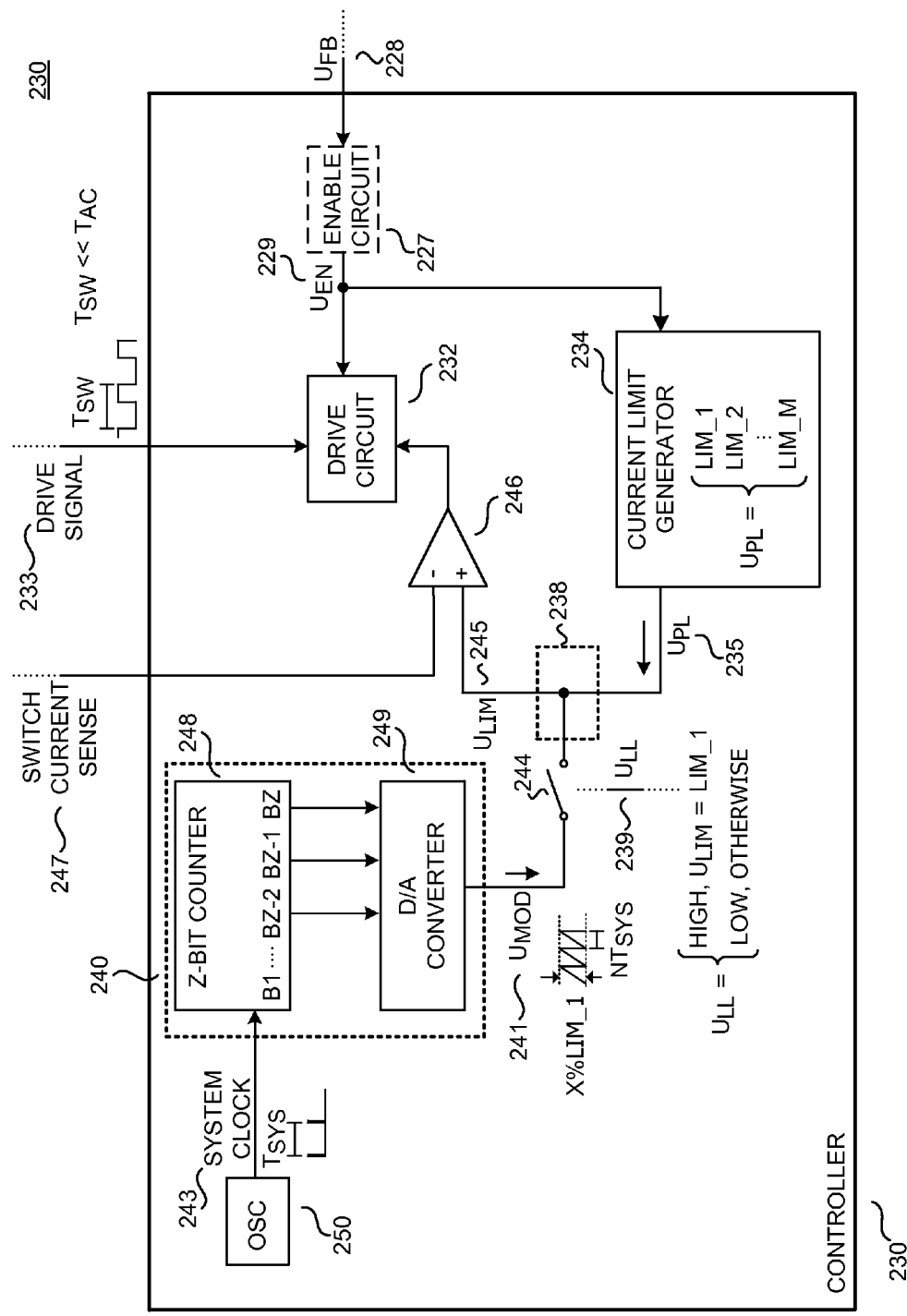
FIG. 2 illustrates an example controller that may be included in an example power converter in accordance with the teachings of the present invention.

FIG. 2 illustrates an example controller 230 which may be one example of controller 130. The controller 230 is similar to controller 130 however the modulation circuit 240 is illustrated as including a counter 248 and digital to analog converter (DAC) 249. In addition, the current limit generator 234 may select the initial current limit $U_{PL}$ 235 from one of a plurality of values and the light load sense circuit may output a light load signal $U_{LL}$ 239 when the initial current limit $U_{PL}$ 235 is the smallest of the plurality of values.

Current limit generator 234 may select the initial current limit $U_{PL}$ 235 from a plurality of values in response to the feedback signal $U_{FB}$ 228 or alternatively the enable signal $U_{EN}$ 229. In the example shown, the current limit generator 234 may have M number of values, listed as LIM_1, LIM_2, and up to LIM_M. The light load signal $U_{LL}$ 239 may determine a light load condition (and output a logic high value) when the initial current limit $U_{PL}$ 235 is substantially equal to the value LIM_1 (illustrated as the lowest value of the plurality of values). Otherwise, the light load sense signal $U_{LL}$ 239 does not indicate a light load condition (and is logic low). However, it should be appreciated that the light load signal $U_{LL}$ 239 may be logic high when the initial current limit $U_{PL}$ 235 is substantially equal to more than one of the plurality of values (such as LIM_1 and LIM_2) if the selected plurality of values indicate a light load condition of the power conversion system.

The modulation circuit 240 is illustrated as including counter 248 and DAC 249. The counter 248 may couple to receive the system clock 243 and increment or decrement its count value in response to the system clock 243. As illustrated, the counter is a Z-bit counter and its count value is outputted to the DAC 249. B1 is the least significant bit (LSB) of the counter 248 while BZ is the most significant bit (MSB). As illustrated, the MSB (BZ) and prior 2 bits of the internal count of counter 248 are outputted to the DAC 249. The DAC 249 receives the bits from the counter 248 and outputs the modulation signal $U_{MOD}$ 241. In one example, the modulation signal $U_{MOD}$ 241 may be a stepped triangle or stepped sawtooth waveform or any other stepped waveform. However, it should be appreciated that any number of bits may be outputted to the DAC 249. The number of bits outputted may correspond to the granularity of the modulation signal $U_{MOD}$ 241. For example, if the modulation signal $U_{MOD}$ 241 is a stepped waveform, the number of bits outputted by the counter 248 may correspond to the number of steps of the modulation signal $U_{MOD}$ 241. In one example, 1 step may include 16 switching cycles. In one example, 3 bits would correspond with 8 steps. In addition, the number of bits used may also determine the period $NT_{SYS}$ of the modulation signal $U_{MOD}$ 241, where N comprises of multiplying the steps of the modulation signal $U_{MOD}$ 241 to the number of switching cycles. For example, 3 bits would correspond to a period of (8*16) times the system clock period $T_{SYS}$.

Figure 3A:
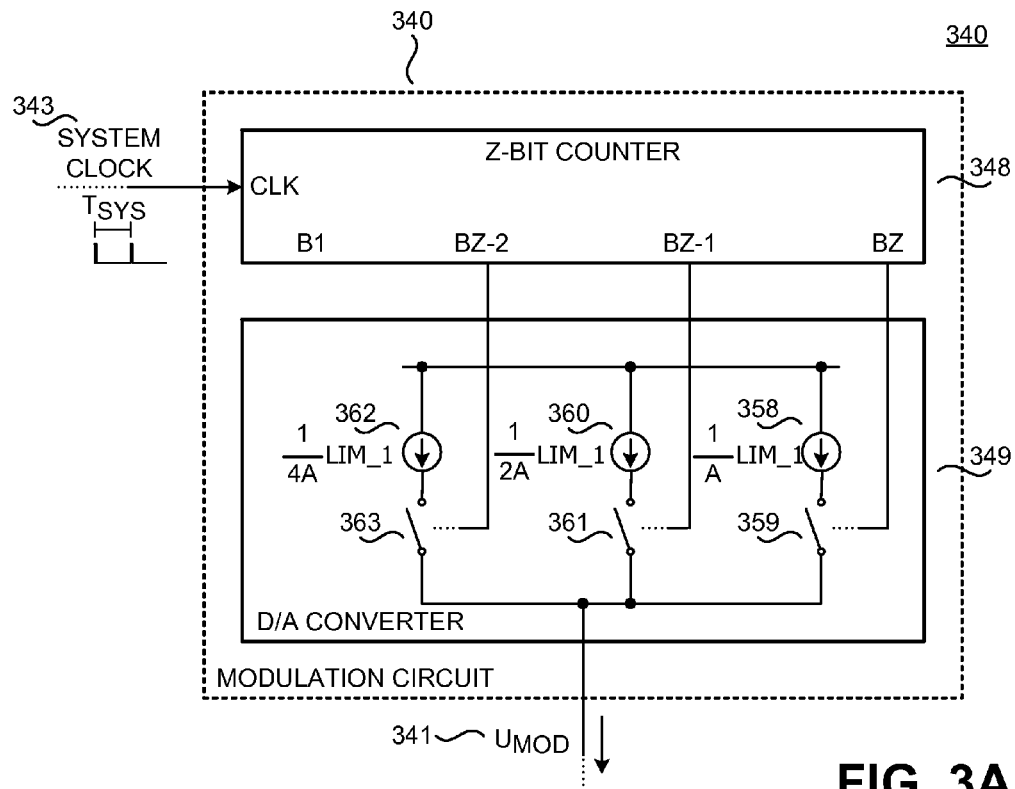
FIG. 3A illustrates an example modulation circuit that may be included in an example controller of an example power converter in accordance with the teachings of the present invention.
Figure 3B:
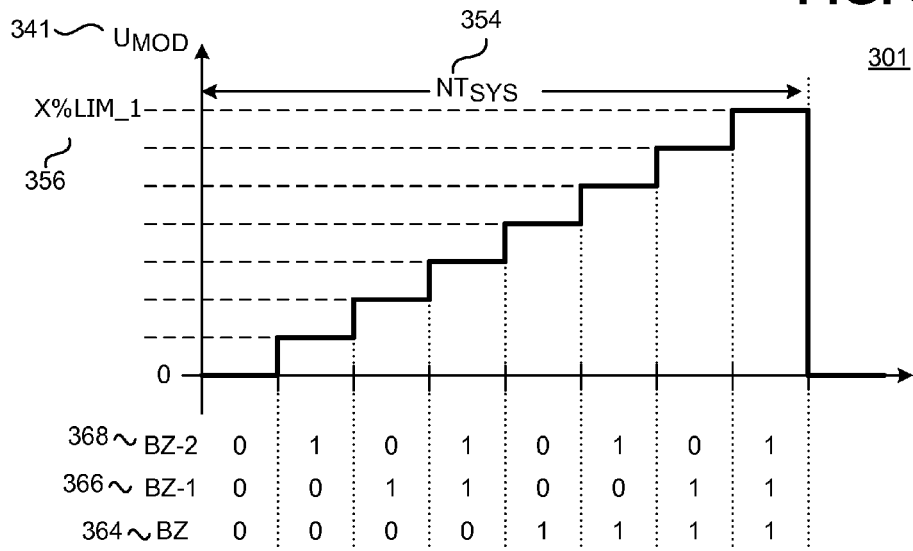
FIG. 3B illustrates an example resultant modulation signal that may be included in an example modulation circuit in accordance with the teachings of the present invention.

FIG. 3A and FIG. 3B illustrate an example modulation circuit 340 and resultant modulation signal $U_{MOD}$ 341 which may be one example of the modulation circuit and modulation signal shown with respect to FIG. 2. For the example shown, modulation circuit 340 outputs a stepped sawtooth waveform for the modulation signal $U_{MOD}$ 341. The modulation circuit 340 is illustrated as including counter 348 and DAC 349. The counter 348 may couple to receive the system clock 343 and increments or decrements its count value in response to the system clock 343. As illustrated, the counter is a Z-bit counter and its count value is outputted to the DAC 349. The DAC 349 is illustrated as including several current sources (358, 360, and 362) and switches (359, 361, and 363). The values of the current sources are weighted depending on the bit of the counter 348 with which it is associated. For example, switch 359 is controlled by bit BZ and the associated current source 358 has a value of $$\frac{1}{A}$$

LIM_1. Switch 361 is controlled to by bit BZ–1 and the associated current source 360 has a value of $$\frac{1}{2A}$$

LIM_1. Switch 363 is controlled by bit BZ–2 and the associated current source 362 has a value $$\frac{1}{4A}$$

LIM_1. As such, the value of current source 358 is double the value of current source 360 and so on. In one example, a logic high value received by the switches (359, 361, and 363) may correspond to a closed (or in other words enabled) switch and vice versa for a logic low value. As illustrated, the current sources (358, 360, and 362) are coupled such that the modulation signal $U_{MOD}$ 341 is the sum of the current sources (358, 360, and 362) when the switches (359, 361, and 363) are closed.

FIG. 3B illustrates the outputted modulation signal $U_{MOD}$ 341 for the modulation circuit 340 of FIG. 3A. When bits (BZ–2) 368, (BZ–1) 366, and BZ 364 are all logic low, switches (359, 361, and 363) are open and the modulation signal $U_{MOD}$ 341 is substantially zero. As the counter 348 increments in response to the system clock 343, each bit also increments and the switches (359, 361, and 363) are opened and closed respectively. In addition, each step of the modulation signal $U_{MOD}$ 341 increases the value of the modulation signal $U_{MOD}$ 341 by substantially $$\frac{1}{4A}$$

LIM_1. The maximum value of the modulation signal $U_{MOD}$ 341 is the amplitude swing, X % LIM_1 and $$X \approx \frac{1}{4A} + \frac{1}{2A} + \frac{1}{A}.$$

The table of bits (BZ–2) 368, (BZ–1) 366, and BZ 364 below the graph of the modulation signal $U_{MOD}$ 341 illustrates the value of bits (BZ–2) 368, (BZ–1) 366, and BZ 364 for each value of the modulation signal $U_{MOD}$ 341.

Figure 4A:
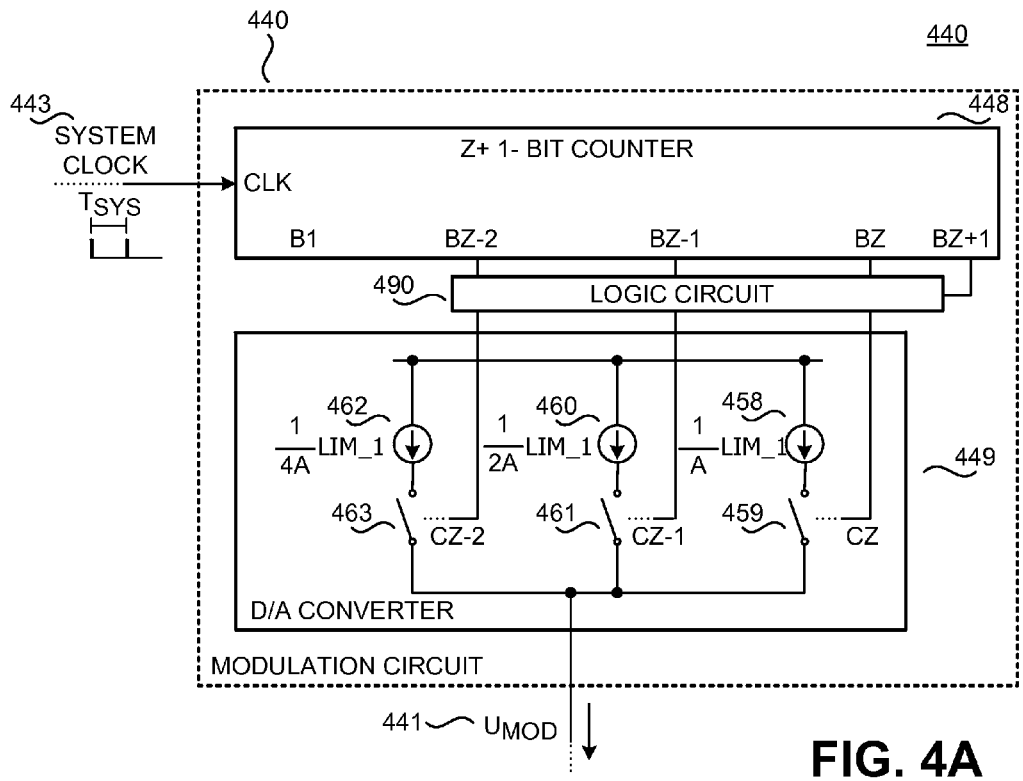
FIG. 4A illustrates another example modulation circuit that may be included in an example controller of an example power converter in accordance with the teachings of the present invention.
Figure 4B:
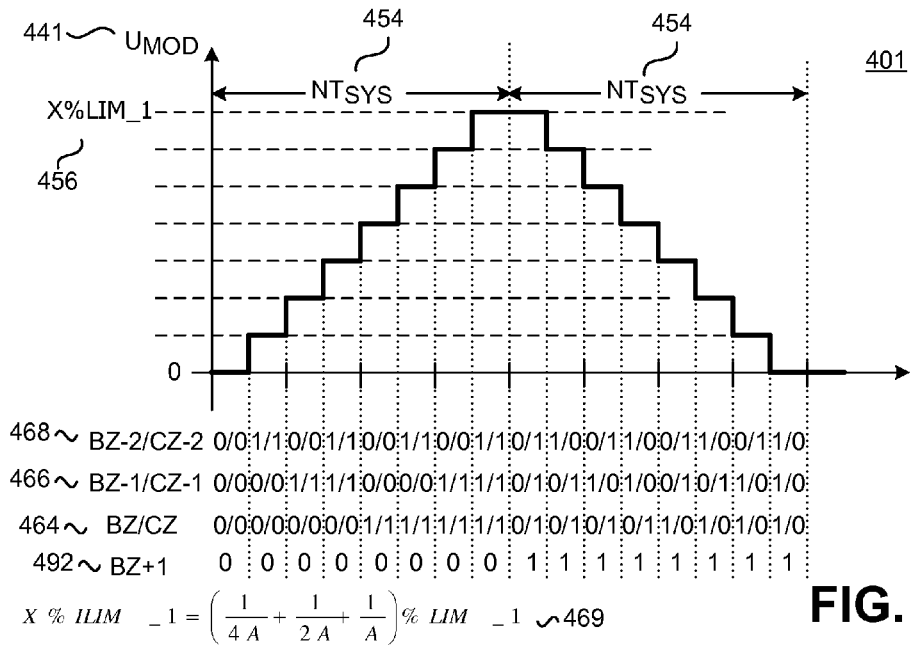
FIG. 4B illustrates an example resultant modulation signal that may be included in an example modulation circuit in accordance with the teachings of the present invention.

FIG. 4A and FIG. 4B illustrate an example modulation circuit 440 and resultant modulation signal $U_{MOD}$ 441 which may be one example of the modulation circuit and modulation signal shown with respect to FIG. 2. The modulation circuit 440 of FIG. 4A is similar to FIG. 3A, however the counter 448 is a (Z+1) bit counter and the modulation circuit 440 further includes a logic circuit 490. The modulation circuit 440 outputs a stepped triangle waveform for the modulation signal $U_{MOD}$ 441. The logic circuit 490 is coupled to receive the bits (BZ–2) 468, (BZ–1) 466, BZ 464, and (BZ+1) 492 and output bits (CZ–2), (CZ+1) and CZ. For this example, bit (BZ+1) is the MSB. When bit (BZ+1) 492 is logic low, bits (CZ–2), (CZ+1) and CZ is substantially equal to the bits (BZ–2) 468, (BZ–1) 466, and BZ 464, respectively. As such, when the bit (BZ+1) 492 is logic low, bits (CZ–2), (CZ+1) and CZ count up from (0, 0, 0) and the modulation signal $U_{MOD}$ 441 is similar to modulation signal $U_{MOD}$ 341. When bit (BZ–1) is logic high, the logic circuit 490 inverts bits (BZ–2) 468, (BZ–1) 466, and BZ 464 and the outputted bits (CZ–2), (CZ+1) and CZ are substantially the inverse of bits (BZ–2) 468, (BZ–1) 466, and BZ 464. As such, bits (CZ–2), (CZ+1) and CZ count down from (1, 1, 1) and the modulation signal $U_{MOD}$ 441 decreases. The table of bits (BZ–2/CZ–2) 468, (BZ–1/CZ–1) 466, (BZ/CZ) 464, and (BZ+1) 492 below the graph of the modulation signal $U_{MOD}$ 341 illustrates the value of each bit for each value of the modulation signal $U_{MOD}$ 441. The resultant waveform of the modulation signal $U_{MOD}$ 441 is similar to the modulation signal shown in FIG. 3B, however the period is substantially $16*N*T_{SYS}$, or double the period of the modulation signal shown in FIG. 3B. Each step of the modulation signal $U_{MOD}$ 441 increases or decreases the value of the modulation signal $U_{MOD}$ 441 by substantially $$\frac{1}{4A}$$

LIM_1. The maximum value of the modulation signal $U_{MOD}$ 441 is the amplitude swing, X % LIM_1 and $$X \approx \frac{1}{4A} + \frac{1}{2A} + \frac{1}{A}.$$

Figure 5:
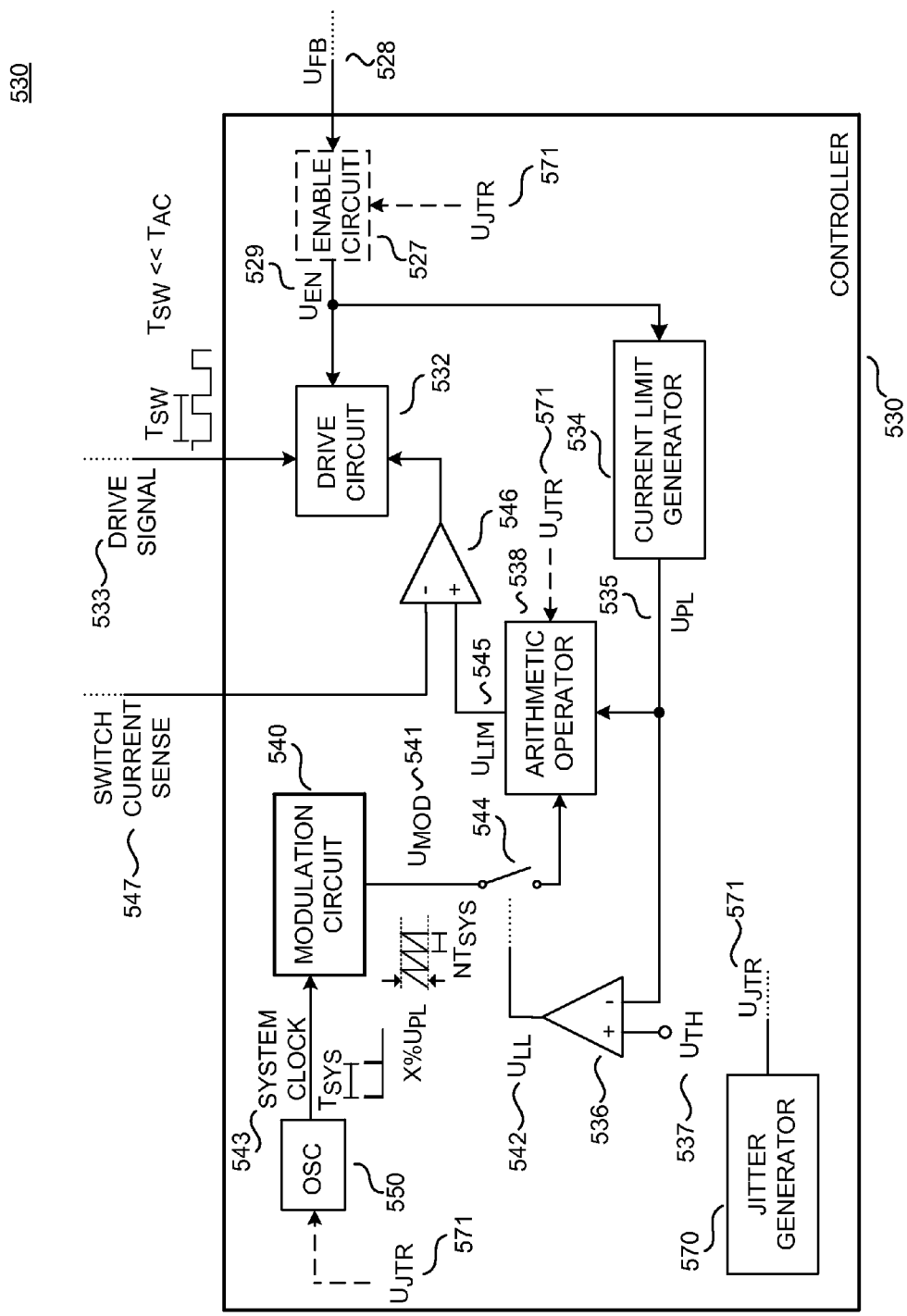
FIG. 5 illustrates another example controller that may be included in an example power converter in accordance with the teachings of the present invention.

FIG. 5 illustrates another example controller 530 which is similar to the controllers discussed with respect to FIG. 1A and FIG. 2. However, the controller 530 illustrated also includes a jitter generator 570 which outputs a jitter signal $U_{JTR}$ 571. The outputted jitter signal UM 571 may be utilized to constantly jitter the switching frequency of the power switch. In one example, the jitter generator 570 generates a jitter signal $U_{JTR}$ 571 to reduce the electromagnetic interference (EMI) emissions of the power supply, particularly the magnitude of the EMI emissions of the power supply. Frequency jittering may be utilized to spread the energy in the harmonics of the switching frequency to reduce the magnitude of some types of EMI emissions.

In the example shown, the jitter signal Um 571 may be introduced at the enable circuit 527 and may jitter the frequency which enable pulses of the enable signal $U_{EN}$ 529 are generated. The jitter signal Um 571 may also be introduced to the initial current limit $U_{PL}$ 535 through the arithmetic operator 538. For this example, the initial current limit $U_{PL}$ 535 may be constantly modulated by the jitter signal Um 571 and further modulated by the modulation signal $U_{MOD}$ 541 when the power converter is in a light load condition. In addition, the jitter signal may also be introduced to the oscillator 550 which would jitter the frequency of the system clock 543.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller for use in a power converter comprising a power switch, the controller comprising:
   a comparator coupled to compare a current sense signal representing a switch current conducted by the power switch with a current limit, wherein the comparator outputs a comparator output signal representative of whether the switch current has reached the current limit;
   a drive circuit coupled to receive a feedback signal representative of an output of the power converter and the comparator output signal, the drive circuit coupled to generate a drive signal to control switching of the power switch to regulate an output of the power converter in response to the comparator output signal, wherein the drive circuit turns off the power switch when the switch current reaches the current limit;
   a current limit generator coupled to receive the feedback signal and generate an initial current limit signal, wherein the current limit is responsive to the initial current limit;
   a light load sense circuitry coupled to output and sense a light load condition of the power converter and output a light load signal; and
   a current limit modulation circuitry coupled to output a modulation signal and modulate the initial current limit in response to the light load signal indicating a light load condition.

2. The controller of claim 1, wherein the current limit is substantially the initial current limit when the light load condition is not sensed and wherein the current limit is substantially the current limit modulated by the modulation signal when the light load condition is sensed.

3. The controller of claim 1, wherein the light load sense circuitry determines the light load condition when the initial current limit is less than a threshold.

4. The controller of claim 1, wherein the initial current limit signal may be one of a plurality of discrete values.

5. The controller of claim 1, wherein the modulation signal may be a triangular waveform or a sawtooth waveform.

6. The controller of claim 1, wherein the current limit modulation circuitry further comprises:
   a counter coupled to receive a clock signal and increment or decrement a count in response to the clock signal, wherein the modulation signal is responsive to the increment or decrement of the count.

7. The controller of claim 1, wherein the controller further comprises:
   an arithmetic operator coupled to receive the modulation signal and the initial current limit and output the current limit, wherein the current limit is responsive to an arithmetic operation of the modulation signal and the initial current limit; and
   a switch coupled to be controlled by the light load signal, wherein the arithmetic operator may receive the modulation signal when the switch is ON.

8. The controller of claim 7, wherein the arithmetic operator is a terminal.

9. The controller of claim 1, wherein the modulation signal may be a digital step signal.

10. The controller of claim 9, wherein the controller further includes an enable circuit coupled to receive the feedback signal and output an enable signal, wherein the enable circuit may determine to turn ON the power switch.

11. The controller of claim 1, wherein the controller further includes a jitter generator coupled to output a jitter signal, wherein the jitter generator may modulate a switching frequency of the power switch.

12. The controller of claim 11, wherein the jitter signal may be received by an arithmetic operator or an oscillator coupled to generate a clock signal.

13. The controller of claim 12, wherein the jitter signal may be received by the enable circuit.

14. A controller for a switch mode power converter that comprises a power switch, the controller comprising:
   a comparator to compare a current sense signal representing current conducted by the power switch with a current limit and, in response to the comparison indicating that the current conducted by the power switch exceeds the current limit, output a signal indicative thereof;
   power switch drive circuitry responsive to the signal indicative of the current exceeding the current limit to switch the power switch into an off-state;
   light load sense circuitry coupled to sense a light load on the switch mode power converter and output a light load signal in response thereto;

current limit modulation circuitry to modulate the current limit in response to the light load signal indicating a light load on the switch mode power converter.

* * * * *